Figure 1:
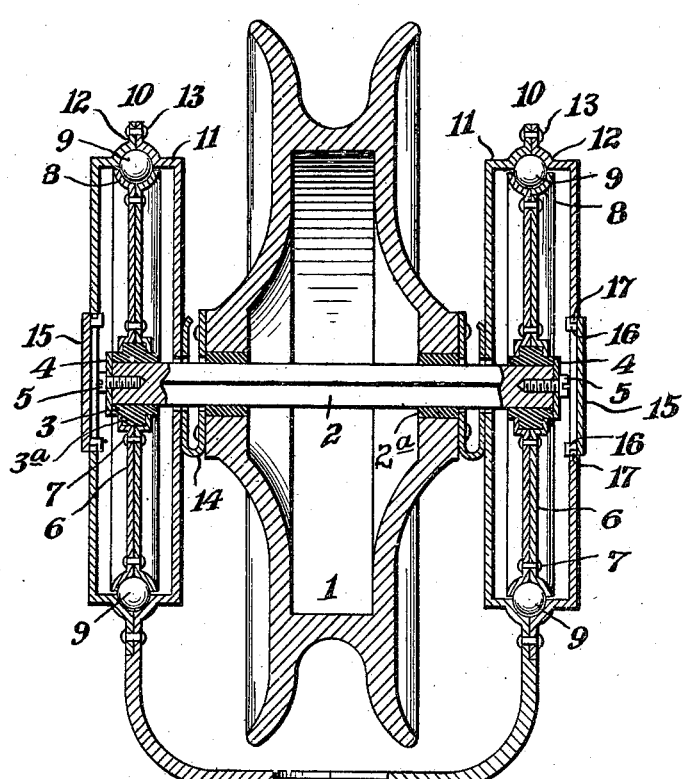
Figure 2:
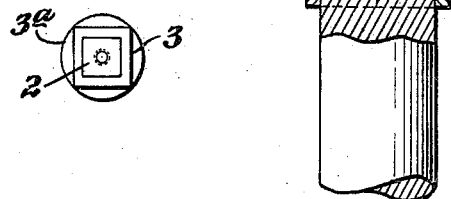

F. H. HOWARD.
TROLLEY.
APPLICATION FILED DEC. 27, 1909.

991,207.

Patented May 2, 1911.

WITNESSES:
Daniel Webster, Jr.
J. O'R. Kelly.

F. H. Howard,
INVENTOR
BY
ATTORNEY.

UNITED STATES PATENT OFFICE.

FRANK H. HOWARD, OF READING, PENNSYLVANIA.

TROLLEY.

991,207. Specification of Letters Patent. Patented May 2, 1911.

Application filed December 27, 1909. Serial No. 535,117.

*To all whom it may concern:*

Be it known that I, FRANK H. HOWARD, citizen of the United States, residing at Reading, in the county of Berks and State of Pennsylvania, have invented certain new and useful Improvements in Trolleys, of which the following is a specification.

This invention relates to improvements in trolleys for use on electric street railways using overhead feed wires.

The invention has for its objects, the making of a trolley in which the wheel may be readily removed and replaced and one in which the friction is removed from the wheel shaft and reduced to a minimum. I accomplish these objects by mounting the wheel on a shaft of rectangular cross-section, and which is removable from the wheel, and on the ends of this shaft I secure, in a removable manner, anti-friction bearings of enlarged diameter; together with a harp carrying inclosing members for said ball bearings.

The invention is more fully described in the following specification and clearly illustrated in the accompanying drawing which shows a central, vertical sectional view of my complete trolley.

The numeral 1 designates the contact wheel and 2 is a shaft of rectangular cross-section which fits in a rectangular opening in the wheel but which can be readily removed therefrom. On the ends of this shaft I secure insulators 3 of rectangular inside and outside surfaces but having an enlarged central circular portion 3ª, and on the extremities of this shaft I secure disks 4, of greater diameter than the thickness of the shaft 2 and these disks are held in position by screws 5 which enter the ends of the shaft. The removal of these disks will permit the withdrawal of the shaft thus allowing the wheel to be easily removed from its position in the harp.

Around the rectangular insulators 3, I place a pair of plates 6, riveted together at points 7 and engaging the enlarged central portion 3ª of the insulators. The periphery of these plates are curved so that when joined, they form one-half of a ball race 8 and in this ball race I place the usual anti-friction balls 9. These bearings are inclosed in casings formed in the upper ends of the harp 10. These harp members 10 are made up of stamped sheet metal and each is formed with one-half of the bearing casing 11 while the other half is in the form of a separate piece 12, secured thereto by rivets 13 near its periphery. These casing members, when joined, form, in connection with the plates 6, the complete ball race for the bearing balls 9.

The usual conductor spring 14 is located at each side of the wheel 1, in contact with both the wheel and the harp and adapted, in addition to its usual function, to insure the maintaining of the wheel in the central position between the harp members. The outer members 12 of the bearing casings are formed with central openings in which I locate removable closures 15. These closures are provided with one or more keys 16, adapted to enter slots 17 in the rim of the opening, which, when so entered may be turned slightly in either direction to effectually lock the closures in position. It will be seen that to remove the wheel, the closures 15 and one of the disks 4 are removed and the shaft 2 may then be withdrawn from both the harp and wheel.

The wheel 1 is insulated from the shaft 2 by means of insulators 2ª, interposed between the wheel and shaft. When in position for use, it is evident that the wheel, the shaft and the plates 6 forming the ball race are so mounted that they will revolve as a single body for the reason that the shaft is located in the rectangular opening in the wheel and in the insulators 3 and that these insulators 3 are located in rectangular openings in the plates 6. By my construction it is evident that the bearing balls are kept free from danger of burning or arcing, as the current does not pass through them. The harp is made of two like members, of either sheet metal or cast metal, joined together at their lower extremities, and to the trolley pole, in any suitable simple manner.

Having thus fully described my invention, what I claim and desire to secure by Letters Patent is:—

In a trolley, a hollow wheel having a rectangular bore, a removable shaft of rectangular cross-section, a pair of plates secured to each end of the shaft, insulators interposed between the shaft and said plates, said plates being curved at the periphery to form ball races, balls located in said races, a two part harp, casings formed in the upper extremities of said harp for inclosing the ball bearings, a closure plate for each of
5 said casings, each plate carrying keys adapted to engage the casing to lock the closure in position.

In testimony whereof I affix my signature, in presence of two witnesses.

FRANK H. HOWARD.

Witnesses:
ED. A. KELLY,
FREDERICK A. HOWARD.